A. P. WOLFE.
ANCHORAGE FOR AUTOMOBILE RADIATORS.
APPLICATION FILED FEB. 5, 1921.
1,405,245. Patented Jan. 31, 1922.
2 SHEETS—SHEET 1.
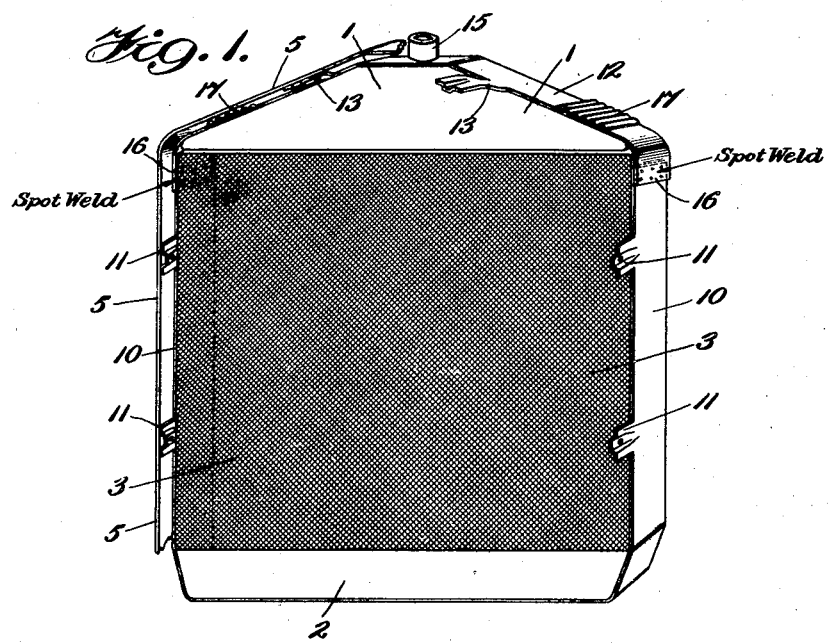
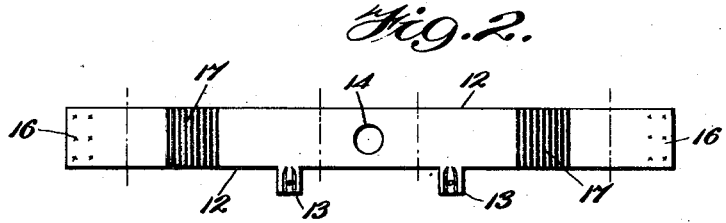
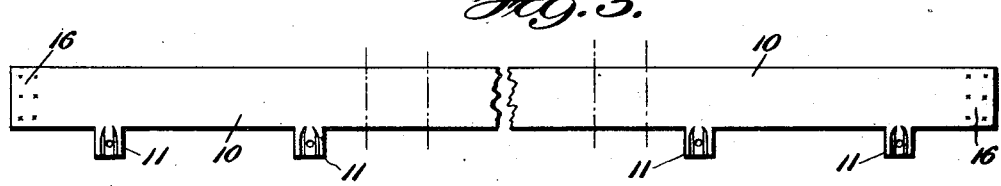
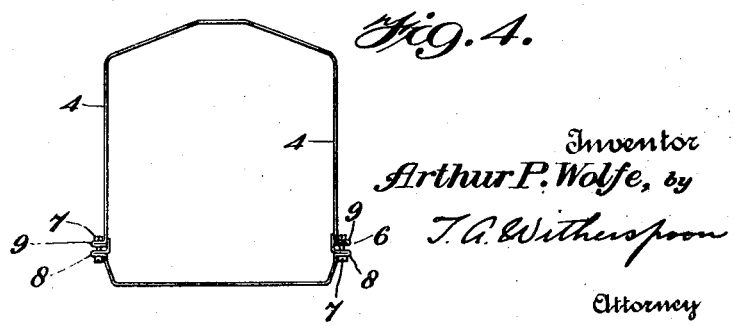
Inventor
Arthur P. Wolfe, by
T. A. Witherspoon
Attorney

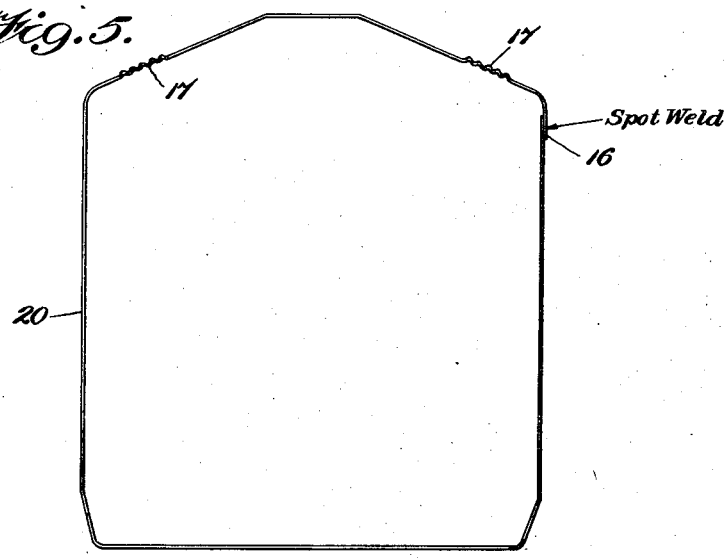
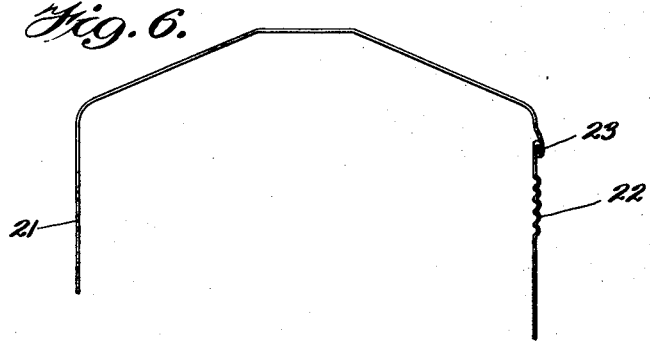
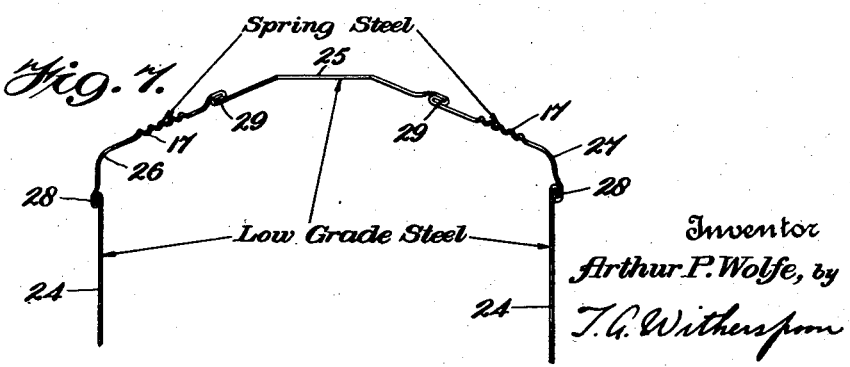

UNITED STATES PATENT OFFICE.

ARTHUR P. WOLFE, OF LOCKPORT, NEW YORK, ASSIGNOR TO HARRISON RADIATOR CORPORATION, A CORPORATION OF NEW YORK.

ANCHORAGE FOR AUTOMOBILE RADIATORS.

1,405,245.   Specification of Letters Patent.   Patented Jan. 31, 1922.

Application filed February 5, 1921.  Serial No. 442,767.

*To all whom it may concern:*

Be it known that I, ARTHUR P. WOLFE, a citizen of the United States, residing at Lockport, in the county of Niagara and State of New York, have invented certain new and useful Improvements in Anchorages for Automobile Radiators; and I do hereby declare the following to be a full, clear, and exact description of the invention, such as will enable others skilled in the art to which it appertains to make and use the same.

This invention relates to anchorages for automobile radiator cores and tanks, and has for its object to provide a device of this nature which will be comparatively inexpensive to construct and more efficient in action than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a perspective view of a radiator proper to which has been applied an anchorage made in accordance with this invention;

Figure 2 is a plan view of a strip of metal suitable for making the upper portion of the anchorage;

Figure 3 is a plan view of a strip of metal suitable for making the lower portion of the anchorage.

Figure 4 is a diagrammatic elevational view illustrating the old form of anchorage now in use;

Figure 5 represents a modified form of anchorage made in accordance with this invention;

Figure 6 represents a still further modified form of anchorage made in accordance with this invention.

Figure 7 represents a still further modified form of anchorage made in accordance with this invention.

In order that the precise invention may be the more clearly understood it is said: An automobile radiator as understood by the manufacturer thereof, consists of three separate parts as follows: First, the radiator proper formed by the top tank 1 and the bottom tank 2, fastened to the core 3, or other tubular connections located between said top and bottom tanks thus forming a container and a cooling apparatus for the circulating water. Second, the well known shell or metal frame 5, inside of which the radiator proper is fitted, and serving to provide a means for fastening the radiator to the frame work of the automobile, as well as to give a finished appearance to the complete apparatus. Third, the anchorage proper or connection between the radiator proper and the casing, consists of a strip or band of metal drawn tightly around the radiator proper, and having at intervals brackets rigid therewith so as to provide a means by which the said anchorage after having been clamped around the tanks and core of the radiator may in turn be bolted to the inside of the said shell or casing, 5.

The anchorages or radiator suspensions heretofore proposed and now in common use are illustrated in Figure 4 and have been made, as there shown, in a plurality of parts 4 bolted together at at 6 and 7, in order to permit them to receive and to firmly grip the radiator core and tanks. But this construction and procedure not only involves an increased cost of manufacture in both labor and material, over the present invention, but it is not satisfactory, owing to the bending of the ledges 8 and 9 under the changes in temperature due to the hot water passing through the radiator, and owing to the nuts and bolts wearing loose under the severe and long continued vibrations to which said anchorage is subjected in use.

The construction of this invention, on the other hand, not only obviates these objections, but it also supplies one or more elastic sections or springs in the anchorage band itself, which serves to firmly and yieldingly grip the core and tanks under the severe strains to which they are subjected in such a way as to hold them more securely and to subject them to less injury than has been the case heretofore.

In the drawings, 10 represents a band preferably of steel, suitable for the lower portion of the anchorage and provided with the lugs 11 adapted to secure the finished anchorage to the casing or shell, 5. 12 represents a band of steel suitable for the upper portion of the anchorage provided with the ears or lugs 13 for securing to the shell or casing and with the hole 14 to accommodate the water receiving nipple 15. 16 represents portions of the strips 10 and 12 which are spot welded or otherwise integrally secured together in the finished anchorage, while 17 represents corrugations, bends, or other distortions of the strips 10 and 12 but preferably located in the upper strip 12, and adapted to afford integral, strong and resilient spring sections capable of firmly gripping and of resiliently holding the core 3 and tanks 1 and 2 in place during the severe twisting and racking strains to which they are subjected when traversing rough roads at high speeds.

It will now be clear that by the simple expedient of corrugating the strip 12 or the strip 10 and by regulating the depth and size of the corrugations to suit the purpose in hand, I am enabled to provide one or more spring sections in the anchorage band which will so firmly and resiliently hold the core and tanks together that, notwithstanding rough roads and changes in temperature due to hot water traversing the core, a minimum damage will be experienced by the radiator proper.

This is a most important result, because as is well known, radiator cores are provided with vertical water passages and with air passages at right angles to the water passages, making up a cellular construction which is exceedingly liable to leak under even moderate twisting and racking strains due to rough roads, and therefore any band or anchorage which will firmly and resiliently hold the parts together without permitting said twisting and racking strains to cause leaks is a most desirable construction in this art.

I attain these most advantageous results by omitting all bolts and other fastenings which are liable to come loose, and by providing the integral spring sections 17, which will readily give and thus prevent undue straining of the parts.

In the somewhat modified form of the invention shown in Figure 5, the anchorage band 20 is made of a single strip, corrugated at 17, and its ends are spot welded or otherwise secured together as indicated at 16.

In the still further modified form of the invention shown in Figure 6, the anchorage band 21 is also made of a single strip of metal, is corrugated as at 22, and its ends are crimped together as at 23. This said crimped joint 23 may be left without other fastenings, or it may have a rivet extending therethrough, or it may be soldered together, or it may be electrically welded together.

In the still further modified form of the invention shown in Figure 7, the lower portion of the anchorage band may consist of a single strip 24 of low grade steel, while the portion 25 of the upper part of said anchorage band may be made either of a low grade or other quality of steel, and additional portions 26 and 27 may be made of spring steel and provided with the corrugations 17 as shown.

Between the ends of the strip 24 and one end of the strips 26 and 27 I provide the crimped joints 28 as shown, and between the other end of the strips 26 and 27 and the two ends of the section 25, I provide the similar crimped joints 29 as shown.

It will thus be seen that in all the forms of the invention there are no bolts, nuts, or holes through lugs to wear, so that there is no chance for the joints to become loose under excessive strains and thus will all the forms disclosed above hold the core and tanks firmly and resiliently in place.

Another important feature of this invention is the fact that the spring portions 17 are so regulated in size, strength and resiliency as will best serve the purpose for which the particular radiator or car is to be put. That is to say, for larger pleasure cars and trucks requiring a relatively large and heavy radiator, the size, number, strength and resiliency of the spring sections 17 of the anchorage will be proportionately greater than will be the case with an anchorage for a smaller radiator carried by a smaller car. In other words, the above factors may be varied within wide limits to meet the requirements of any particular case.

It is preferred to manufacture this anchorage in the form of a closed hoop like structure from a continuous strip made of a single piece or from a plurality of pieces of metal joined together as indicated, by securing the ends of said strip as disclosed after having provided the strip with one or more corrugated spring sections 17. The closed hoop like structure thus produced may be then caused to receive and firmly grip the radiator proper by springing it over the assembled parts with the aid of a suitable tool. Owing to the fact that the spring sections 17 will yield to a considerable extent, the fitting of the anchorage around the radiator is reduced to a simple, quick and inexpensive operation.

It is obvious that those skilled in the art may vary the details of construction as well as the arrangement of parts without departing from the spirit of the invention, and therefore I do not wish to be limited to the above disclosure except as may be required by the claims.

What I claim is:

1. An anchorage for an internal combustion engine radiator comprising a continuous strip of material adapted to encircle the radiator core and provided with an integral spring section and said strip having its ends permanently joined together to form a closed loop, substantially as described.

2. An anchorage for automobile radiators comprising a strip of metal provided with a corrugated spring section and with fastening lugs and having its ends permanently secured together, substantially as described.

3. In an automobile engine cooling apparatus the combination of a pair of water tanks; a radiator core disposed between said tanks; and an anchorage encircling said core and tanks comprising a continuous strip of metal having one of its portions formed into a spring section and having its ends permanently joined together, substantially as described.

4. In an automobile engine cooling apparatus the combination of a pair of water tanks; a radiator core disposed between said tanks; and an anchorage encircling said core and tanks comprising a continuous strip of metal provided with securing lugs and having one of its portions formed into a spring section and also having its ends permanently joined together, substantially as described.

5. In a cooling device for automobile engines the combination of a radiator proper; an anchorage encircling said radiator comprising a strip of metal having a corrugated spring section between its ends and provided with securing lugs, said ends being permanently joined together; and said lugs adapted to secure the device to the shell of the automobile, substantially as described.

6. In a cooling device for internal combustion engines the combination of a radiator comprising a plurality of tanks and connections between them; an anchorage comprising a strip of metal encircling said radiator, provided with a resilient section intermediate to its ends, and having securing lugs, said ends being permanently joined together; and a casing associated with said lugs, substantially as described.

7. In a cooling device for internal combustion engines the combination of a radiator comprising a plurality of tanks and connections between them; an anchorage comprising a plurality of strips of metal having their ends permanently connected together to form a continuous strip, encircling said radiator, and provided with a resilient portion and with securing lugs; and a casing secured to said lugs, substantially as described.

In testimony whereof I affix my signature.

ARTHUR P. WOLFE.